United States Patent
Stanavich

[19]

[11] Patent Number: 6,036,280
[45] Date of Patent: *Mar. 14, 2000

[54] TWO PIECE VEHICLE WHEEL WITH PRESS FIT RIM

[75] Inventor: John R. Stanavich, Chelsea, Mich.

[73] Assignee: Hayes Lemmerz International, Inc., Northville, Mich.

[ * ] Notice: This patent is subject to a terminal disclaimer.

[21] Appl. No.: 09/126,800

[22] Filed: Jul. 31, 1998

Related U.S. Application Data

[60] Provisional application No. 60/054,291, Jul. 31, 1997.

[51] Int. Cl.$^7$ .................................................. B60B 23/04
[52] U.S. Cl. ................................... 301/63.1; 301/64.3
[58] Field of Search ................................. 301/63.1, 64.2, 301/64.3

[56] References Cited

U.S. PATENT DOCUMENTS

| | | |
|---|---|---|
| 3,506,311 | 4/1970 | Nobach . |
| 3,859,704 | 1/1975 | Nasson . |
| 4,363,347 | 12/1982 | Baumgartner . |
| 5,257,455 | 11/1993 | Iwatsuki . |
| 5,421,642 | 6/1995 | Archibald . |
| 5,803,553 | 9/1998 | Wei .................................... 301/63.1 |

FOREIGN PATENT DOCUMENTS

| | | |
|---|---|---|
| 0 096 399 | 12/1983 | European Pat. Off. . |
| 1570620 | 6/1969 | France ................................ 301/63.1 |
| 350 3882 | 8/1986 | Germany ........................... 301/63.1 |
| 7-237044 | 9/1995 | Japan . |
| 85002586 | 6/1985 | WIPO ................................. 301/63.1 |

*Primary Examiner*—Russell D. Stormer
*Attorney, Agent, or Firm*—MacMillan, Sobanski & Todd, LLC

[57] ABSTRACT

A partial wheel rim is press fit onto a cylindrical collar which extends axially from an inboard surface of a fall face wheel disc. The rim includes a circumferential bead which is received by a corresponding circumferential groove formed in the wheel disc collar to retain the wheel rim upon the wheel disc.

22 Claims, 5 Drawing Sheets

FIG. 1

PRIOR ART

TWO PIECE VEHICLE WHEEL WITH PRESS FIT RIM

CROSS REFERENCE TO RELATED APPLICATIONS

This application claims the benefit of U.S. Provisional Application No. 60/054,291, filed on Jul. 31, 1997.

BACKGROUND OF THE INVENTION

This invention relates in general to vehicle wheels and in particular to two piece wheels having a wheel rim mechanically attached to a wheel disc with a press fit.

It is known in the art to fabricate a vehicle wheel by attaching a wheel rim to a separately formed wheel disc. Typically, the wheel rim is rolled from steel strip stock and the disc is stamped from steel sheet stock. The rim is welded to the disc to form the wheel. Such a wheel is shown in U.S. Pat. No. 5,257,455 to Iwatsuki. Alternately, the wheel rim can be rolled from steel and the wheel disc cast or forged from a light weight metal, such as aluminum, titanium or magnesium, or an alloy of a light weight metal. Because the metals forming the rim and disc are different, a ferrous weld anchor is usually attached to the wheel disc. The wheel rim is welded to the weld anchor to assure that a good weld is formed between the rim and disc. Such a wheel is described in U.S. Pat. No. 3,506,311 to Nobach and is commonly referred to as a bimetal wheel. A bimetal wheel combines the economy, flexibility and strength of a steel wheel rim with the pleasing ornamental appearance of three dimensional contours formed in a cast or forged wheel disc.

To enhance the appearance of a two piece bimetal wheel, it is known to attach a fall face wheel disc, which includes the outboard tire retaining flange, to a partial wheel rim to form a full face bimetal wheel. When a tire is mounted upon a full face wheel, the joint between the wheel disc and wheel rim is completely hidden and only the wheel disc is visible. A decorative finish is often applied to the face of the wheel disc to further enhance the appearance of the wheel. Examples of typical decorative finishes include metal plating, such as chromium plating, clear coatings and paint.

Figure 1:
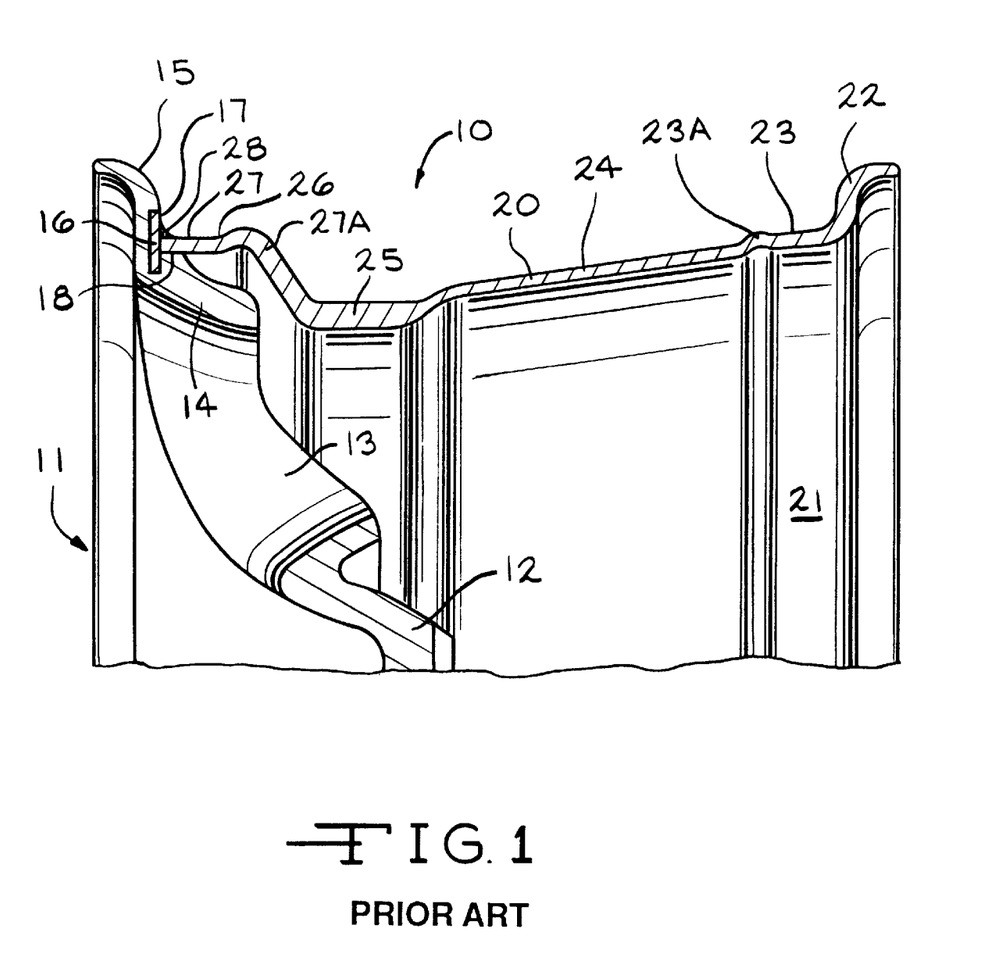
FIG. 1 is a fragmentary sectional view of a prior art two piece wheel.

Referring now to the drawings, there is shown in FIG. 1 a fragmentary sectional view of a typical prior art bimetal full face wheel 10. The wheel 10 is described in the Nobach patent listed above and includes a full face wheel disc 11 formed from a light weight metal or light weight metal alloy by a conventional process, such as gravity, low pressure or die casting. The full face wheel disc 11 includes a central wheel hub 12 which is supported by a plurality of wheel spokes 13 (one shown) within an annular sidewall 14. An outboard tire bead retaining flange 15 extends in a radial outward direction from the sidewall 14.

A ring-shaped weld anchor 16 formed from a ferrous material, such as steel, is partially embedded in the wheel disc sidewall 14. A portion of the weld anchor 16 is exposed to form a welding surface 17. The sidewall 14 further includes a cylindrically-shaped shoulder 18 which extends axially from the inboard side of the flange 15. The shoulder 18 extends radially over a portion of the weld anchor 16 to secure the weld anchor 16 to the wheel disc 11.

A conventional partial wheel rim 20 is attached to the inboard side of the wheel disc 11. The wheel rim 20, which is formed from steel strip stock with conventional rim roll forming machinery, includes an inboard end 21 terminating in a conventional inboard tire bead retaining flange 22. An inboard tire bead seat 23 and inboard safety bead 23A are also formed on the inboard end 21 of the wheel rim 20. A leg portion 24 extends in an outward axial direction from the inboard safety bead 23A. A deepwell 25 is formed in the wheel rim 20 adjacent to the leg portion 24. The wheel rim 20 also includes a cylindrically-shaped outboard end 26 which is adjacent to the deepwell 25. The outboard wheel rim end 26 includes an outboard tire bead seat 27 and outboard safety bead 27A. The outboard rim end 26 extends over the wheel disc shoulder 18 and into contact with the welding surface 17 of the weld anchor 15. The outboard rim end 26 and the wheel disc collar 18 are typically sized to form a clearance fit therebetween, allowing the wheel rim 20 to be rotated relative to the wheel disc 11.

An alternate structure for the weld anchor is disclosed in U.S. Pat. No. 5,421,642 to Archibald where the weld anchor includes an annular collar which is received by the outboard end of a partial wheel rim. The weld anchor collar positions the wheel rim upon the wheel disc.

A continuous circumferential air-tight weld 28 is formed between the wheel rim 20 and the weld anchor 16. Typically, a conventional friction or inertial welding process is used to form the weld 28. During the welding process, the wheel disc 11 is held stationary while the wheel rim 20 is rotated with the outboard wheel rim end 26 pressed against the weld anchor 16. The heat generated by friction partially melts the wheel rim end 26 and the adjacent portion of the weld anchor 16 to form the weld 28.

While the wheel disc is typically welded to the wheel rim, it is also known to heat shrink the wheel rim onto the wheel disc, as shown in U.S. Pat. No. 4,363,347 to Baumgartner and European Patent Application No. 0 096 399 to Stahlschmidt & Malwurm GmbH & Co. KG. The U.S. Patent discloses wheel structures having either cylindrical or conical shrinkage surfaces. The U.S. Patent also discloses optional cutting or rolling of threads on the cylindrical shrinkage surfaces to allow the disc to be threadedly attached to the wheel rim. The European Patent Application discloses conical shrinkage surfaces. The European Patent Application further discloses optional forming of cleats and corresponding grooves, which receive the cleats, on the shrinkage surfaces.

SUMMARY OF THE INVENTION

This invention relates to a two piece wheel which has a wheel rim mechanically attached to a wheel disc with a press fit.

As described above, two piece vehicle wheels typically include a wheel disc welded to a wheel rim which is formed by a rolling or spinning operation. The heat of welding has been known to warp the wheel disc and/or the wheel rim. Also, a layer of oxidized metal can form on the welding surface of the wheel disc and on the adjoining surface of the wheel rim. This layer of oxidized metal can prevent formation of a satisfactory weld between the wheel disc and wheel rim. When a partial wheel rim is welded to a fall face wheel disc, oxidation on the welding surface can prevent formation of an air-tight weld between the wheel rim and the wheel disc. As a result, tire inflation air may leak from a tire mounted upon the assembled wheel. Metal oxidization on the welding surface also can occur if the wheel disc is subjected to a plating process to form a decorative layer on the visible portion of the wheel disc. Additionally, the heat generated by the welding operation used to attach the wheel rim to the wheel disc can damage the decorative finish of the wheel disc. If the wheel finish is flawed, the entire wheel must be scrapped. It is known to delay applying the decorative finish to the wheel disc until after the wheel is welded; however, this requires a more complex manufacturing process. Accordingly, it would be desirable to fabricate two piece wheels without a welding operation. This would eliminate the potential of heat damage to the wheel, allow application of the decorative finish to the wheel disc, before assembly of the wheel and reduce the scrap rate for assembled wheels. It also would be desirable to fabricate two piece wheels without the need to heat shrink the wheel rim onto the wheel disc. The heat shrinking operation increases the time and cost of assembly.

The present invention contemplates a two piece vehicle wheel including a wheel disc having a cylindrical shoulder extending axially from an inboard surface. The wheel disc shoulder has a circumferential wheel disc bead formed thereon and a circumferential wheel disc recess formed therein outboard from the wheel disc bead. The wheel also includes a partial wheel rim having a cylindrical outboard end. The outboard wheel rim end has a circumferential wheel rim bead formed thereon and a circumferential wheel rim recess formed therein inboard from the wheel rim bead. The wheel rim end extends over the wheel disc shoulder with the wheel rim bead being received by the wheel disc recess and the wheel disc bead being received by the wheel rim recess. The beads and recesses cooperate to mechanically secure the wheel disc to the wheel rim.

In the preferred embodiment, at least one of the wheel disc or wheel rim beads is press fit into a corresponding recess. Furthermore, the invention contemplates that at least one of the wheel disc or wheel rim beads has a ramped or inclined surface formed thereon to facilitate pressing the wheel rim end onto the wheel disc shoulder. Additionally, a resilient material is disposed between the wheel disc and the wheel rim to form a continuous circumferential air-tight seal therebetween.

The invention also contemplates a two piece wheel having a plurality of alternating parallel beads and recesses formed on the outboard wheel rim end and a corresponding plurality of alternating parallel beads and recesses formed on the wheel disc shoulder. The wheel rim beads and recesses cooperate with the wheel disc beads and recesses to mechanically secure said wheel rim to the wheel disc. Additionally, the beads and recesses formed on the wheel disc shoulder can be stepped with the diameters of the beads and recesses increasing in an outboard direction. Similarly, the beads and recesses on the wheel rim are stepped to correspond to the stepped wheel disc beads and recesses.

The invention further contemplates a process for fabricating a two piece wheel which includes providing a wheel disc having a cylindrical shoulder extending axially from an inboard surface. The wheel disc shoulder has at least one circumferential wheel disc bead formed thereon and a circumferential wheel disc recess formed therein outboard from the wheel disc bead. A partial wheel rim having a cylindrical outboard end is also provided. The outboard wheel rim end has a circumferential wheel rim bead formed thereon and a circumferential wheel rim recess formed therein inboard from the wheel rim bead. The wheel rim end is pressed onto the wheel disc shoulder with the wheel rim bead and the wheel disc bead riding over one another and into the wheel disc recess and the wheel rim recess, respectively. The beads cooperate with the recesses to mechanically secure the wheel disc to the wheel rim.

To facilitate pressing the wheel rim onto the wheel disc shoulder, at least one of the wheel disc or wheel rim beads can include a ramped surface. The ramped surface cooperates with the other bead surface when the wheel rim is pressed onto the wheel disc so that the other bead slides along the ramped surface and over the bead having the ramped surface. Additionally, a resilient material can be applied to one of the wheel rim and the wheel disc before assembly so that a continuous circumferential air-tight seal is formed therebetween when the wheel rim is pressed onto the wheel disc.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
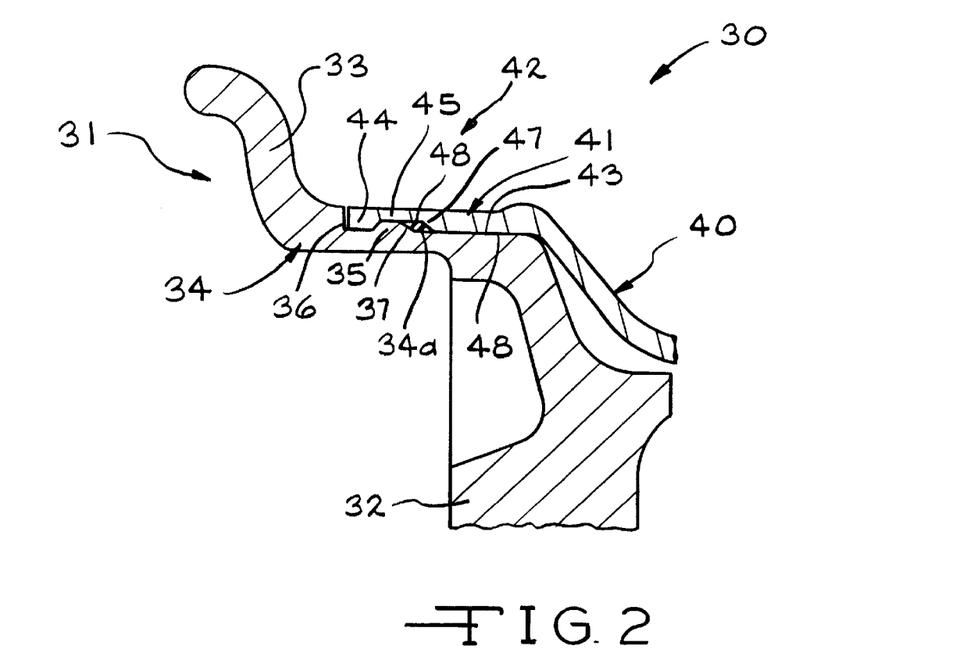
FIG. 2 is a fragmentary sectional view of a two piece wheel in accordance with the invention.

The present invention contemplates a press fit vehicle wheel assembly including a partial wheel rim and a fall face wheel disc. Referring again to the drawings, there is illustrated in FIG. 2 a fragmentary sectional view of a two piece vehicle wheel 30. In the preferred embodiment, the vehicle wheel 30 is a bimetal wheel which includes a full face wheel disc 31 formed from a light weight metal, such as aluminum, titanium or magnesium, or an alloy of a light weight metal, by a conventional process, such as gravity or low pressure casting, or forging. While the preferred embodiment includes a wheel disc 31 formed from a light weight metal, it will be appreciated that the wheel disc 31 also can be stamped or forged from steel or stainless steel or formed from a plastic. Additionally, the wheel disc 31 can be cast from stainless steel with the Hitchner process. In the preferred embodiment, the wheel disc 31 includes a decorative surface finish (not shown). For example, a layer of plating, such as chrome plating, can be deposited upon a portion of the wheel disc surface, or a layer of paint or a clear coating can be applied to the wheel disc 31.

As shown in FIG. 2, the wheel disc 31 includes an annular sidewall 32. An outboard tire bead retaining flange 33 extends in an outward radial direction from the sidewall 32. The radial outer surface of the sidewall 32 forms a generally cylindrical shoulder 34 which includes a recessed portion 34a. A circumferential bead 35 is formed on the recessed portion 34a. A circumferential recess 36 also is formed in the recessed portion 34a adjacent to the outboard side of the bead 35. In the preferred embodiment, the bead 35 and recess 36 extend continuously 360 degrees around the shoulder 34; however, one or both of the bead and recess can be discontinuous.

Figure 3:
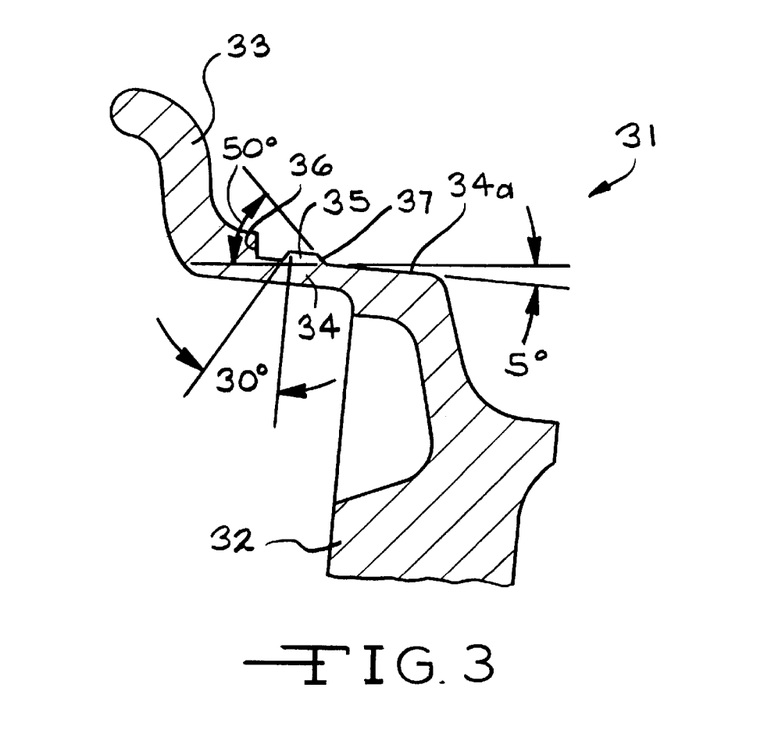
FIG. 3 is a fragmentary sectional view of the wheel disc shown in FIG. 2.

The bead 35 includes a ramped inboard surface 37. As best shown in FIG. 3, the ramped surface 37 is inclined at an angle with the wheel axis which is not greater than about 50°, and, preferably, at an angle not greater than about 45°. The purpose for the ramped surface 37 will be described below. Additionally, as shown in FIG. 3, the recessed portion 34a portion of the wheel disc shoulder 34 which is inboard of the bead 35 is tapered. In the preferred embodiment, the taper is approximately five degrees. Furthermore, the outboard surface of the bead 35 can be formed with a slope as shown in FIG. 3; however, such a slope is optional In the preferred embodiment, the slope of the outboard bead surface is approximately 30 degrees from a plane which is perpendicular to the wheel axis, as also shown in FIG. 3.

The wheel 30 also includes a partial wheel rim 40. In the preferred embodiment, the wheel rim 40 is formed from steel strip stock with conventional wheel rim roll forming machinery; however, it will be appreciated that the wheel rim 40 also can be formed with a spinning, casting or forging process. Additionally, the wheel rim 40 can be formed from a light weight metal, such as aluminum, titanium or magnesium, an alloy of a light weight metal, a plastic or stainless steel. The wheel rim 40 can optionally include a decorative finish (not shown). For example, a layer of plating, such as chrome plating, can be deposited upon a portion of the wheel rim surface, or a layer of paint or a clear coating can be applied to the wheel rim 40.

The wheel rim 40 has a cylindrical outboard end 41 which includes a portion of an outboard tire bead seat 42. The wheel rim end 41 includes a radial inner surface 43. A circumferential bead 44 is formed in the inner surface 43, at the outboard end of the wheel rim 40. A circumferential recess 45 is formed in the inner surface 43 adjacent to the inboard side of the bead 44. In the preferred embodiment, the bead 44 and recess 45 are continuous; however, one or both of the bead and recess could be discontinuous. As shown in FIG. 2, when the wheel rim 40 and disc 31 are assembled, the wheel rim recess 45 corresponds to the wheel disc bead 35 and the wheel rim bead 44 corresponds to the wheel disc recess 36.

As further shown in FIG. 2, the wheel rim end 41 extends axially over the wheel disc shoulder 34. The wheel disc bead 35 is received in the wheel rim recess 45, and the wheel rim bead 44 is received in the wheel disc recess 36. The beads 35 and 44 and recesses 45 and 36 cooperate to mechanically secure the disc 31 to the rim 40. The disc 31 and rim 40 are constructed so that at least one of the beads 35, 44 is received in the corresponding recess 45, 36 in a press fit in the radial direction. Preferably, both of the beads 35, 44 are press fit into the corresponding, recesses 45, 36. The press fit between the beads 35, 44 and corresponding recesses 45, 36 provides a secure mechanical attachment between the wheel disc 31 and the wheel rim 40. The ramped surface 37 formed on the inboard side of the wheel disc bead 35 cooperates with the wheel rim bead 44 to elastically deform the rim end 41 in an outward radial direction to slide over the wheel disc bead 35. Once the wheel rim bead 44 has cleared the wheel disc bead 35, the resiliency of the wheel rim material "snaps" the wheel rim bead 44 into the wheel disc recess 36. In the preferred embodiment, an interference tolerance of approximately 0.005 inches is contemplated for the press fit.

In the preferred embodiment, an annular cavity 47 is formed between the ramped surface 37 of the wheel disc bead 35 and the adjacent surface of the wheel rim 40. A continuous ring of resilient material 48 is disposed within the cavity 47 to provide a circumferential air-tight seal between the wheel disc 31 and the wheel rim 40. The resilient material can also be applied between one or both of the beads 35, 44 and the corresponding recesses 45, 36. Alternately, the resilient material can be disposed between the end of the outboard wheel rim 40 and the wheel disc 31. In the preferred embodiment, the resilient material includes an adhesive to farther secure the wheel rim 40 to the wheel disc 31.

Figure 4:
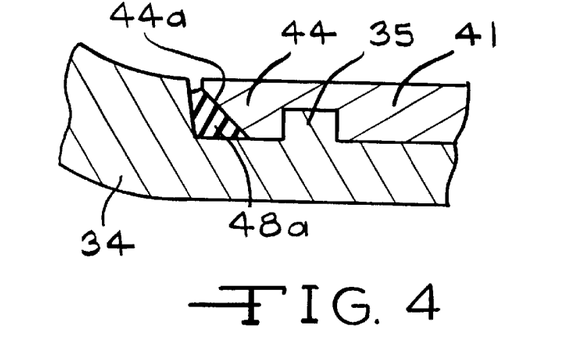
FIG. 4 is an enlarged sectional view of an alternate embodiment of the wheel structure shown in FIG. 2.

An alternate embodiment of the structure for mechanically attaching the wheel disc 31 to the wheel rim 40 is illustrated in FIG. 4 where components which are similar to components shown in FIG. 2 have the same numerical identifiers. In FIG. 4, an inclined, or ramped, surface 44a is formed on the outboard side of the wheel rim bead 44. As described above, in the preferred embodiment, the angle of the inclined surface 44a with the wheel axis in FIG. 4 is between approximately 45 and 50 degrees. As described above, the inclined surface 44a facilitates the press fit of the wheel rim end 41 over the wheel disc shoulder 34. A continuous ring of resilient material 48a is disposed between the end of the wheel rim 41 and the wheel disc 34 to form a circumferential air-tight seal therebetween.

Figure 5:
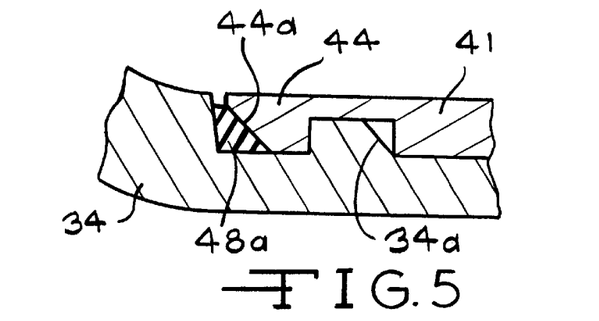
FIG. 5 is an enlarged sectional view of another alternate embodiment of the wheel structure shown in FIG. 2.

Similarly, another alternate embodiment of the invention is shown in FIG. 5, where a first inclined surface 34a is formed upon the inboard side of the wheel disc bead 35 and a second inclined surface 44a is formed upon the outboard side of the wheel rim bead 44. With the structure shown in FIG. 5, the first and second inclined surfaces 34a and 44a cooperate when the wheel rim 41 is pressed onto the wheel disc shoulder 34 to urge the wheel rim bead 44 in an outward radial direction. As shown in FIG. 4, a continuous ring of resilient material 48a is disposed between the end of the wheel rim 41 and the wheel disc 34 to form a circumferential air-tight seal therebetween. Alternately, a continuous ring of resilient material can be disposed between the first inclined surface 34a and the wheel rim 41 (not shown), as illustrated in FIG. 2.

While the preferred embodiment has been described for a bimetal wheel, it will be appreciated that the invention also can be practiced on a wheel having a disc and rim formed from the same metal, different alloys of the same metal or plastics. For example, a wheel rim formed from a first alloy of aluminum can be attached to a wheel disc formed from a second alloy of aluminum, with the second alloy of aluminum being different from the first alloy of aluminum.

Figure 6:
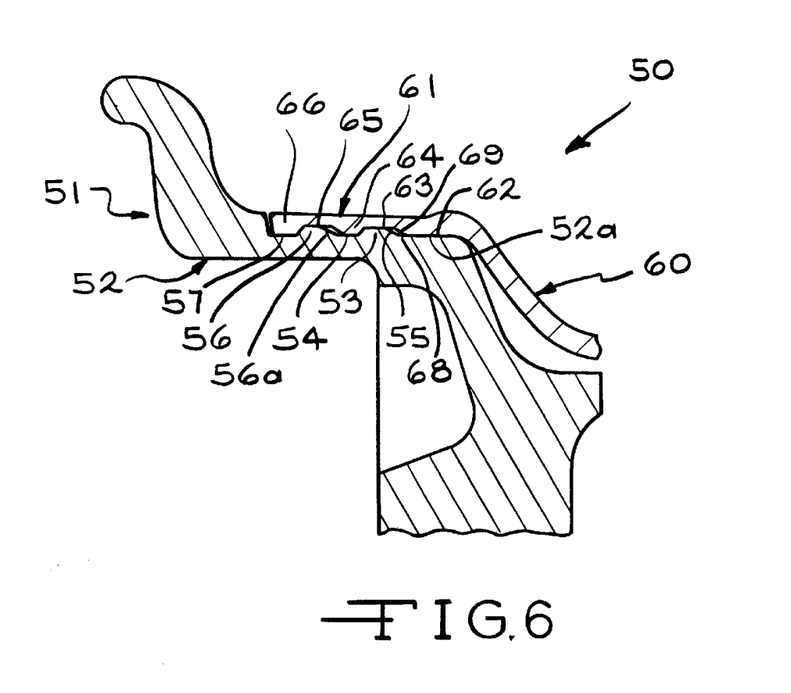
FIG. 6 is a fragmentary sectional view of an alternate embodiment of the wheel shown in FIG. 2.

As shown in FIG. 6, the invention further contemplates an alternate embodiment of a two piece wheel 50. The wheel 50 includes a fall face wheel disc 51 having a generally cylindrical shoulder 52. The shoulder 52 includes a recessed portion 52a. A first circumferential bead 53 is formed on the inboard portion of the recessed portion 52a of the shoulder 52, and a first circumferential recess 54 is formed therein adjacent to the outboard side of the first bead 53. Similar to tie wheel 30 described above, the first bead 53 includes a ramped inboard surface 55. A second circumferential bead 56 is formed on the recessed portion 52a of the shoulder 52 adjacent to the outboard side of the first recess 54. The second bead 56 also includes a ramped inboard surface 56a. In the preferred embodiment, the second bead 56 is parallel to the first bead 53. A second circumferential recess 57 is formed in the outer surface 52a adjacent to the outboard side of the second bead 56. Also similar to the wheel 30 described above, the beads 53, 56 and recesses 54, 57 can be continuous or discontinuous.

The wheel 50 also includes a partial wheel rim 60 having a cylindrical outboard end 61. The wheel rim end 61 includes a radial inner surface 62. A first circumferential recess 63 is formed in the inboard portion of the inner surface 62. A first circumferential bead 64 is formed on the inner surface 62 adjacent to the outboard side of the first recess 63. A second circumferential recess 65 is formed in the inner surface 62 outboard from the first bead 64. In the preferred embodiment, the second recess 65 is parallel to the first recess 63. A second circumferential bead 66 is formed on the inner surface 62 adjacent to the outboard side of the second recess 65, at the outboard end of the wheel rim 60. As shown in FIG. 6, when the wheel rim 60 and disc 51 are assembled, the first and second wheel rim recesses 63, 65 correspond to the first and second wheel disc beads 53, 56, respectively, and the first and second wheel disc recesses 54, 57 correspond to the first and second wheel rim beads 64, 66, respectively. Additionally, the wheel rim recesses 63, 65 and beads 64, 66 can be continuous or discontinuous.

As further shown in FIG. 6, the wheel rim end 61 is press fit onto the wheel disc shoulder 52 and extends axially thereover. As described above, the ramped surfaces 55 and 56a cooperate with the associated wheel rim beads 64 and 66 to facilitate assembly of the wheel 50. The first and second wheel disc beads 53, 56 are received in the first and second wheel rim recesses 63, 65, respectively, and the first and second wheel rim beads 64, 66 are received in the first and second wheel disc recesses 54, 57, respectively. As a result, the disc 51 is mechanically secured to the rim 60. The double beads and double recesses on each of the disc 51 and rim 60 provide a double locking structure for a very secure attachment of the rim on the disc.

In the preferred embodiment, an annular cavity 68 is formed between the ramped surface 55 of the first wheel disc bead 53 and the adjacent surface of the rim 60. A continuous ring of resilient material 69 is disposed in the cavity 68 to provide a circumferential air-tight seal between the wheel disc 51 and rim 60. Alternately, the resilient material can be disposed between the wheel rim end 61 and the wheel disc shoulder 52. As described above, the resilient material can include an adhesive.

While the preferred embodiment has been illustrated in FIG. 6 with ramps formed in the inboard surfaces 55 and 56a of the wheel disc beads 53 and 56, respectively, it will be appreciated that the invention can also be practiced with ramped surfaces formed upon the wheel rim beads as illustrated in FIG. 4. Alternately, ramped surfaces can be formed upon both the wheel disc beads and wheel rim beads, as illustrated in FIG. 5. Additionally, while two beads and recesses are shown on the wheel disc and wheel rim in FIG. 6, it will be appreciated that the invention also can be practiced with more than two beads and recesses.

Figure 7:
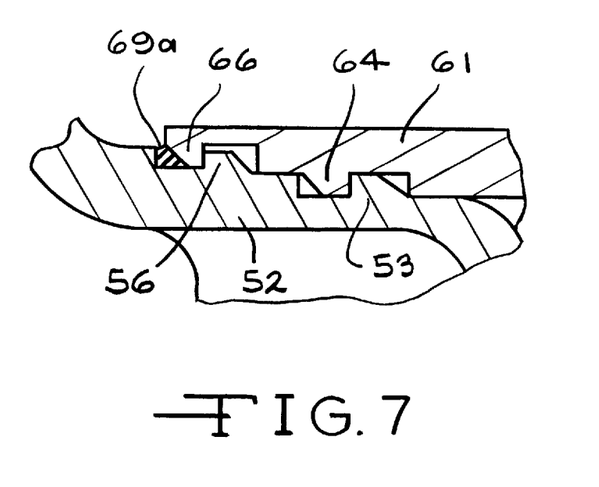
FIG. 7 is an enlarged sectional view of an alternate embodiment of the wheel structure shown in FIG. 6.

An alternate embodiment of the structure for mechanically attaching the wheel disc 51 to the wheel rim 60 is illustrated in FIG. 7 where components which are similar to components shown in FIG. 6 have the same numerical identifiers. In FIG. 6, the wheel disc shoulder 52 is stepped such that the first and second beads 53 and 56 have different outer diameters, with the outer diameter of the second bead 56 being greater than the outer diameter of the first bead 53. Similarly, the inner surface of the outboard end 61 of the wheel rim is stepped to correspond to the wheel disc shoulder 52. As a result, the second wheel rim bead 66 passes over the first wheel disc bead 53 and is pressed over the second wheel disc bead 56 while the first wheel rim bead 64 is pressed over the first wheel disc bead 53 when the wheel rim end 61 is pressed onto the wheel disc shoulder 52. Also, a continuous ring 69a formed from a resilient material is disposed between the rim end 61 and the wheel disc shoulder 52.

Figure 8:
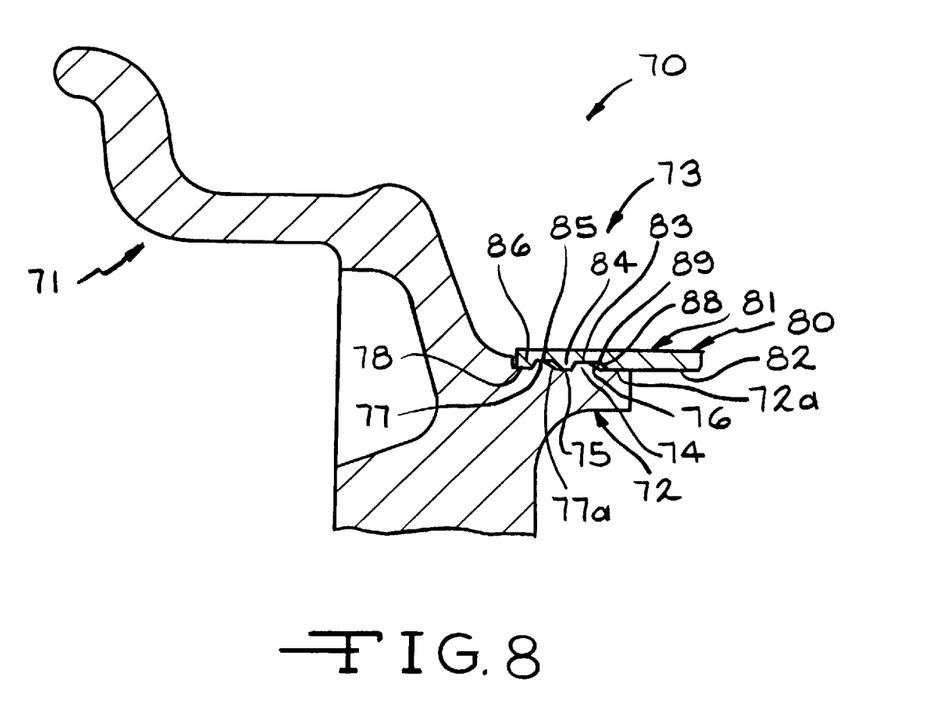
FIG. 8 is a fragmentary sectional view of another embodiment of the wheel shown in FIG. 2.

FIG. 8 illustrates another alternate embodiment of a two piece wheel 70 where the wheel rim is secured to the wheel disc in the deep well portion of the wheel. The wheel 70 includes a fall face wheel disc 71. The wheel disc 71 includes a cylindrical collar 72 which extends axially from an inboard surface of the wheel disc 71 and has a radial outer surface 72a. A first circumferential bead 74 is formed on the inboard portion of the outer surface 72a, and a first circumferential recess 75 is formed in the outer surface 72a adjacent to the outboard side of the first bead 74. The first bead 74 includes a ramped inboard surface 76. A second circumferential bead 77 is formed on the outer surface 72a adjacent to the outboard side of the first recess 75, and a second circumferential recess 78 is formed in the outer surface 72a adjacent to the outboard side of the second bead 77. The second bead 77 also includes a ramped inboard surface 77a.

The wheel 70 also includes a partial wheel rim 80 having a cylindrical outboard end 81. The wheel rim end 81 and the wheel disc shoulder 72 cooperate to form a deepwell 73 for the wheel 70. The wheel rim end 81 includes a radial inner surface 82. A first circumferential recess 83 is formed on the inboard portion of the inner surface 82. A first circumferential bead 84 is formed in the inner surface 82 adjacent to the outboard side of the first recess 83. A second circumferential recess 85 is formed on the inner surface 82 adjacent to the outboard side of the first bead 84. A second circumferential bead 86 is formed in the inner surface 82 adjacent to the outboard side of the second recess 85, at the outboard end of the wheel rim end 81. As shown in FIG. 5, when the wheel rim 80 and disc 71 are assembled, the first and second wheel rim recesses 83, 85 correspond to the first and second wheel disc beads 74, 77, respectively, and the first and second wheel disc recesses 75, 78 correspond to the first and second wheel rim beads 84, 86, respectively.

As further shown in FIG. 8, the wheel rim end 81 is press fit onto the wheel disc shoulder 72 and extends axially thereover. As described above, the ramped surfaces 76 and 77a cooperate with the associated wheel rim beads 84 and 86 to facilitate assembly of the wheel 70. The first and second wheel disc beads 74, 77 are received in the first and second wheel rim recesses 83, 85, respectively, and the first and second wheel rim beads 84, 86 are received in the first and second wheel disc recesses 75, 78, respectively. As a result, the disc 71 is mechanically secured to the rim 80.

An annular cavity 88 is formed between the ramped surface 76 of the first wheel disc bead 74 and the adjacent surface of the rim 80. In the preferred embodiment, a continuous ring 89 formed from a resilient material is disposed in the cavity 88 to provide an air-tight seal between the wheel disc 71 and the wheel rim 80. However, as above, the resilient ring can be disposed in an alternate location between the wheel disc 71 and the wheel rim 80. Additionally, while the wheel structure has been illustrated in FIG. 8 as having two beads and recesses formed in the wheel disc and wheel rim, it will be appreciated that the invention also can be practiced with more or less beads and recesses.

Figure 9:
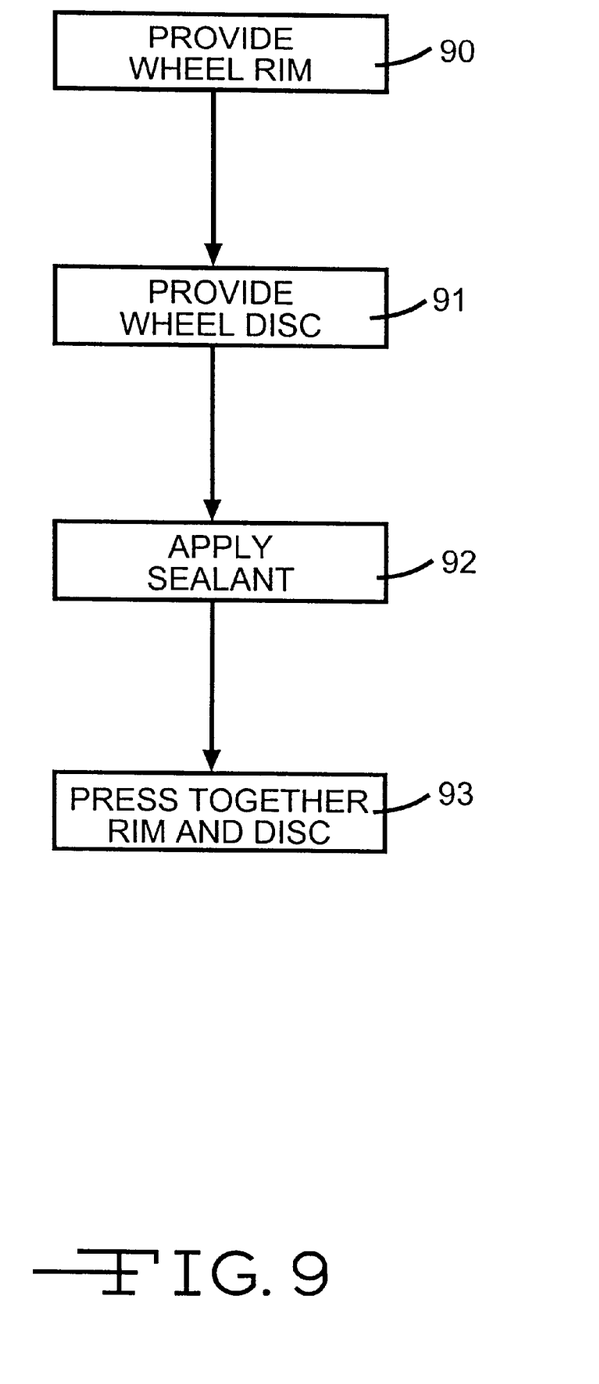
FIG. 9 is a flow chart for a process for fabricating the wheel shown in FIG. 2.

The invention also contemplates a process for fabricating the wheels described above, which is illustrated by a flow chart shown in FIG. 9. In functional block 90, a wheel rim is provided including a cylindrical outboard end. The wheel rim has an outboard circumferential wheel rim bead formed on the end thereof and a circumferential wheel rim recess formed therein adjacent to the inboard side of the wheel rim bead. In functional block 91, a wheel disc is provided including a cylindrical inboard shoulder. The wheel disc has an inboard circumferential wheel disc bead formed on the wheel disc shoulder and a circumferential wheel disc recess formed therein adjacent to the outboard side of the wheel disc bead. At least one of the wheel rim bead or the wheel disc bead has a ramped surface which is inclined at an angle of not greater than about 50° from the wheel axis. The ramped surface of the wheel rim bead is an outboard surface, and the ramped surface of the wheel disc bead is an inboard surface. In the preferred embodiment, the wheel rim and the wheel disc are constructed so that an annular cavity is formed between the ramped surface and an adjacent surface of the wheel rim or the wheel disc when the wheel rim and the wheel disc are assembled.

In functional block 92, a sealant is applied on the ramped surface or an adjacent surface of the wheel rim or wheel disc so that the sealant is disposed in the cavity when the wheel rim and the wheel disc are assembled.

In functional block 93, the wheel rim and the wheel disc are pressed together. As the wheel rim end is pressed over the wheel disc shoulder, the wheel rim bead is pressed against the wheel disc bead. The ramped surface allows the wheel rim bead to ride over the wheel disc bead as they are pressed together. The wheel rim end is elastically deformed to allow the wheel rim bead to pass over the wheel disc bead. When the beads have passed one another, the elasticity of the wheel rim end causes the wheel rim bead to "snap" into the wheel disc recess, forming a press fit between the wheel rim bead and the wheel disc recess. Similarly, the wheel disc bead is received in the wheel rim recess. The beads cooperate with the corresponding recesses to mechanically secure the wheel disc to the wheel rim. Additionally, the resilient material is compressed to form a continuous, circumferential air-tight seal between the wheel disc and the wheel rim.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the invention has been illustrated in terms of a two piece wheel in which the wheel rim end has a larger diameter than the wheel disc shoulder, the invention is also applicable to two piece wheels in which the wheel disc shoulder has a larger diameter than the wheel rim end (not shown). In such a case, circumferential beads and circumferential recesses are included on the radial inner surface of a wheel disc collar and the radial outer surface of the wheel rim end and the wheel rim is pressed into the wheel disc collar. While the wheel disc shoulder and wheel rim end have been illustrated in particular positions on the wheel disc and wheel rim, they could be positioned in other locations compatible with assembling the wheel. Additionally, it will be appreciated that the invention also can be practiced with ramped surfaces having other angles than those given above.

What is claimed is:

1. A two piece vehicle wheel comprising:
a wheel disc having an inboard surface with a cylindrical shoulder extending axially therefrom, said wheel disc shoulder having a circumferential wheel disc bead formed thereon and a circumferential wheel disc recess formed therein outboard from said wheel disc bead; and
a partial wheel rim having a cylindrical outboard end, said outboard wheel rim end having a circumferential wheel rim bead formed thereon and a circumferential wheel rim recess formed therein inboard from said wheel rim bead, said wheel rim end extending over said wheel disc shoulder with said wheel rim bead being received by said wheel disc recess and said wheel disc bead being received by said wheel rim recess, said beads and said recesses cooperating to mechanically secure said wheel disc to said wheel rim.

2. The vehicle wheel according to claim 1 wherein one of said wheel disc bead and wheel rim bead cooperates with a corresponding recess to form a press fit between said wheel disc and wheel rim.

3. The vehicle wheel according to claim 2 wherein said wheel disc bead has an inboard ramped surface formed thereon.

4. The vehicle wheel according to claim 3 wherein a portion of said wheel disc shoulder which is inboard of said wheel disc bead is tapered in an inboard direction.

5. The vehicle wheel according to claim 3 wherein said ramped surface is formed in said wheel disc bead having an angle which does not exceed 50 degrees relative to the axis of the wheel.

6. The vehicle wheel according to claim 5 wherein said ramped surface is formed in said wheel disc bead having an angle which does not exceed 45 degrees relative to the axis of the wheel.

7. The vehicle wheel according to claim 5 wherein said wheel disc bead has an outboard ramped surface formed upon said wheel disc bead, said outboard ramped surface having an angle of approximately 30 degrees with a plane which is perpendicular to the wheel axis.

8. The vehicle wheel according to claim 5 further including a resilient material disposed between said wheel disc and said wheel rim to form an air-tight seal therebetween.

9. The vehicle wheel according to claim 8 wherein said resilient material includes an adhesive.

10. The vehicle wheel according to claim 2 wherein said wheel rim bead has an outboard ramped surface formed thereon.

11. The vehicle wheel according to claim 10 wherein said ramped surface is formed in said wheel rim bead having an angle which does not exceed 50 degrees relative to the axis of the wheel.

12. The vehicle wheel according to claim 11 wherein said ramped surface is formed in said wheel rim bead having an angle which does not exceed 45 degrees relative to the axis of the wheel.

13. The vehicle wheel according to claim 10 further including an inboard ramped surface formed upon said wheel rim bead, said inboard ramped surface having an angle of approximately 30 degrees with a plane which is perpendicular to the wheel axis.

14. The vehicle wheel according to claim 11 further including a resilient material disposed between said wheel disc and said wheel rim to form an air-light seal therebetween.

15. The vehicle wheel according to claim 1 wherein said wheel disc bead includes an inboard ramped surface and said wheel rim bead includes an outboard ramped surface, whereby said ramped surfaces cooperate with one another to form a press fit of said wheel rim upon said wheel disc.

16. The vehicle wheel according to claim 1 wherein said wheel rim end has a plurality of alternating parallel beads and recesses formed thereon and further wherein said wheel disc shoulder has a plurality of alternating parallel beads and recesses formed thereon which correspond to said wheel rim end beads and recesses, said wheel rim beads and recesses cooperating with said wheel disc beads and recesses to form a press fit between said wheel disc and wheel rim and mechanically secure said wheel rim to said wheel disc.

17. A two piece vehicle wheel comprising:
  a wheel disc having an inboard surface with a cylindrical shoulder extending axially therefrom, said wheel disc shoulder having a plurality of alternating parallel beads and recesses formed thereon; and
  a partial wheel rim having a cylindrical outboard end, said outboard wheel rim end having a plurality of alternating parallel beads and recesses formed thereon which correspond to said wheel disc shoulder beads and recesses, said wheel rim end extending over said wheel disc shoulder with said wheel rim beads being received by said wheel disc recesses and said wheel disc beads being received by said wheel rim recesses with said wheel rim beads and recesses cooperating with said wheel disc beads and recesses to form a press fit between said wheel disc and wheel rim and mechanically secure said wheel rim to said wheel disc.

18. The vehicle wheel according to claim 17 further including a resilient material disposed between said wheel disc and said wheel rim to form an air-tight seal therebetween.

19. A process for fabricating a two piece vehicle wheel comprising the steps of:
  (a) providing a partial wheel rim having a cylindrical outboard end, the outboard wheel rim end having a circumferential wheel rim bead formed thereon and a circumferential wheel rim recess formed therein inboard from the wheel rim bead;
  (b) providing a wheel disc having an inboard surface with a cylindrical shoulder extending axially therefrom, the wheel disc shoulder having a circumferential wheel disc bead formed thereon and a circumferential wheel disc recess formed therein outboard from the wheel disc bead; and
  (c) pressing the wheel rim end onto the wheel disc shoulder with the wheel rim bead and the wheel disc bead riding over one another and into the wheel disc recess and the wheel rim recess, respectively, the beads cooperating with the recesses to mechanically secure the wheel disc to the wheel rim.

20. The process of claim 19 wherein at least one of the wheel disc bead and wheel rim bead includes a ramped surface which cooperates with the other of the wheel rim bead and wheel disc bead during step (c) so that one of the wheel disc bead and wheel rim bead slides along the ramped surface and over the other of the wheel rim bead and wheel disc bead.

21. The process of claim 20 including, subsequent to step (b), applying a resilient material to one of the wheel rim and the wheel disc so that a continuous circumferential air-tight seal is formed between the wheel disc and the wheel rim when the wheel rim is pressed onto the wheel disc in step (c).

22. The process of claim 19 wherein both the wheel disc bead and the wheel rim bead include a ramped surface which cooperates with one another during step (c) so that the wheel disc bead and wheel rim bead slide over one another.

* * * * *

UNITED STATES PATENT AND TRADEMARK OFFICE
CERTIFICATE OF CORRECTION

PATENT NO. : 6,036,280
DATED : March 14, 2000
INVENTOR(S) : John R. Stanavich

It is certified that error appears in the above-identified patent and that said Letters Patent is hereby corrected as shown below:

Claim 14 Line 1,     replace "claim 11" with --claim 10--.
Claim 14 Line 3,     replace "air-light" with --air-tight--.

Replace Claims 16 and 17 with replacement claims 16 and 17 as follows:

16. A two piece vehicle wheel comprising:
a wheel disc having a inboard surface with a cylindrical shoulder extending axially therefrom, said wheel disc shoulder having a plurality of alternating parallel beads and recesses formed thereon; and
a partial wheel rim having a cylindrical outboard end, said outboard wheel rim end having a plurality of alternating parallel beads and recesses formed thereon which

UNITED STATES PATENT AND TRADEMARK OFFICE
CERTIFICATE OF CORRECTION

PATENT NO. : 6,036,280
DATED : March 14, 2000
INVENTOR(S) : John R. Stanavich

It is certified that error appears in the above-identified patent and that said Letters Patent is hereby corrected as shown below:

correspond to said wheel disc shoulder beads and recesses, said wheel rim end extending over said wheel disc shoulder with said wheel rim beads being received by said wheel disc recesses and said wheel disc beads being received by said wheel rim recesses with said wheel rim beads and recesses cooperating with said wheel disc beads and recesses to form a press fit between said wheel disc and wheel rim and mechanically secure said wheel rim to said wheel disc.

17. The vehicle wheel according to claim 16 wherein said beads and recesses formed in said wheel disc shoulder are stepped such that the diameters of said beads and recesses increase in an outboard direction and further wherein said beads and recesses in said wheel rim are similarly stepped to correspond to said wheel disc beads and recesses.

Signed and Sealed this

Third Day of July, 2001

*Nicholas P. Godici*

Attest:

*Attesting Officer*

NICHOLAS P. GODICI
*Acting Director of the United States Patent and Trademark Office*